United States Patent
Magness et al.

(10) Patent No.: US 9,101,188 B2
(45) Date of Patent: Aug. 11, 2015

(54) PROTECTIVE CASE WITH INTEGRAL STAND

(75) Inventors: Cameron Magness, Fort Collins, CO (US); Jamie Johnson, Fort Collins, CO (US); Alan Morine, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 263 days.

(21) Appl. No.: 13/466,346

(22) Filed: May 8, 2012

(65) Prior Publication Data

US 2013/0299498 A1   Nov. 14, 2013

(51) Int. Cl.
| A45C 11/10 | (2006.01) |
| A45C 11/00 | (2006.01) |
| G06F 1/16 | (2006.01) |
| B65D 6/00 | (2006.01) |

(52) U.S. Cl.
CPC .............. *A45C 11/00* (2013.01); *G06F 1/1656* (2013.01); *A45C 2011/002* (2013.01); *A45C 2011/003* (2013.01); *A45C 2200/15* (2013.01); *B65D 11/10* (2013.01)

(58) Field of Classification Search
CPC ..... G06F 1/1613; G06F 1/1656; G06F 1/166; B65D 7/26; B65D 81/02; B65D 11/105; B65D 11/10; A45C 2011/002; A45C 11/00; A45C 2200/15; A45C 2011/003
USPC ................ 248/371, 136, 135, 682, 688, 689; 312/223.1, 223.2; 361/679.56, 807; 220/812, 811, 324, 326, 682, 692, 677, 220/212
See application file for complete search history.

(56) References Cited

U.S. PATENT DOCUMENTS

| 3,410,516 | A |   | 11/1968 | Criswell |
| 3,447,770 | A |   | 6/1969 | Gallamos |
| 3,460,795 | A |   | 8/1969 | Dahlin |
| 4,111,476 | A | * | 9/1978 | Jacobs ........................ 292/246 |
| 4,460,146 | A |   | 7/1984 | Raggiotti |
| 4,674,724 | A |   | 6/1987 | Gaudet |
| 4,915,913 | A | * | 4/1990 | Williams et al. ............. 422/119 |
| 5,360,108 | A |   | 11/1994 | Alagia |
| 5,368,159 | A |   | 11/1994 | Doria |
| 5,380,968 | A |   | 1/1995 | Morse |
| 5,508,479 | A |   | 4/1996 | Schooley |
| 5,607,135 | A |   | 3/1997 | Yamada |
| 6,082,696 | A |   | 7/2000 | Patterson |
| 6,317,313 | B1 |   | 11/2001 | Mosgrove et al. |
| 6,349,824 | B1 |   | 2/2002 | Yamada |
| 6,396,769 | B1 |   | 5/2002 | Polany |
| 6,445,577 | B1 |   | 9/2002 | Madsen et al. |
| 6,456,487 | B1 |   | 9/2002 | Hetterick |
| D470,659 | S | * | 2/2003 | Story et al. .................... D3/291 |
| 6,523,858 | B2 |   | 2/2003 | Takemura |

(Continued)

OTHER PUBLICATIONS

Wibby, U.S. Appl. No. 13/218,676, filed Aug. 26, 2011.

*Primary Examiner* — Fenn Mathew
*Assistant Examiner* — Chetan Chandra

(57) ABSTRACT

A protective case for an electronic device may have two rigid covers that are engaged with a clamping mechanism. The rigid covers, when engaged to the device, may be covered with a removable flexible cover. The protective case may also include a third component that may provide protection for the device in a closed position and operate as a stand in an open position. The third component may be opened and closed using a locking lever, and the third component may open to a stand position.

15 Claims, 6 Drawing Sheets

(56) References Cited

U.S. PATENT DOCUMENTS

| | | |
|---|---|---|
| 6,557,897 B1 | 5/2003 | Gaudet |
| 6,568,543 B1 | 5/2003 | Schneider |
| 6,634,494 B1 | 10/2003 | Derr et al. |
| 6,672,549 B2 | 1/2004 | Kolb |
| 6,729,518 B2 | 5/2004 | Badillo et al. |
| 6,772,879 B1 | 8/2004 | Domotor |
| 6,967,836 B2 | 11/2005 | Huang et al. |
| 7,025,274 B2 | 4/2006 | Solomon et al. |
| 7,194,291 B2 | 3/2007 | Peng |
| 7,236,588 B2 | 6/2007 | Gartrell |
| 7,255,228 B2 | 8/2007 | Kim |
| 7,263,032 B2 | 8/2007 | Polany et al. |
| 7,270,255 B2 | 9/2007 | Badillo et al. |
| 7,318,521 B2 | 1/2008 | Lau |
| 7,343,184 B2 | 3/2008 | Rostami |
| 7,418,278 B2 | 8/2008 | Eriksson et al. |
| 7,597,225 B2 | 10/2009 | Badillo et al. |
| 7,604,123 B2 * | 10/2009 | Seals ............................. 206/522 |
| 7,735,644 B2 | 6/2010 | Sirichai et al. |
| 7,778,023 B1 | 8/2010 | Mohoney |
| 7,782,610 B2 * | 8/2010 | Diebel et al. ............. 361/679.56 |
| D626,964 S | 11/2010 | Richardson et al. |
| 7,861,995 B2 | 1/2011 | Liou |
| 7,907,394 B2 * | 3/2011 | Richardson et al. ....... 361/679.3 |
| 7,933,122 B2 * | 4/2011 | Richardson et al. ..... 361/679.55 |
| 8,070,026 B2 | 12/2011 | Wadsworth et al. |
| 8,100,376 B2 | 1/2012 | Ye |
| 8,231,099 B2 * | 7/2012 | Chen ............................. 248/688 |
| 8,281,924 B2 | 10/2012 | Westrup |
| 8,424,829 B2 | 4/2013 | Lu et al. |
| 8,424,830 B2 | 4/2013 | Yang et al. |
| 8,434,601 B2 | 5/2013 | Hou et al. |
| 8,451,595 B2 * | 5/2013 | Leung et al. ............. 361/679.13 |
| 8,464,995 B2 | 6/2013 | Yang et al. |
| 8,474,609 B1 | 7/2013 | Hong et al. |
| 8,503,170 B1 * | 8/2013 | Hsu et al. ................. 361/679.02 |
| 8,544,639 B2 | 10/2013 | Yang et al. |
| 8,640,864 B2 | 2/2014 | Chen et al. |
| 8,640,868 B2 * | 2/2014 | O'Dowd et al. .............. 206/320 |
| 8,659,893 B2 * | 2/2014 | Chiou ...................... 361/679.55 |
| 8,714,510 B2 | 5/2014 | McCosh et al. |
| 2002/0153373 A1 * | 10/2002 | Traut et al. ................... 220/4.02 |
| 2003/0103624 A1 | 6/2003 | Hu |
| 2005/0279661 A1 | 12/2005 | Hodges |
| 2007/0138920 A1 | 6/2007 | Austin et al. |
| 2007/0158220 A1 * | 7/2007 | Cleereman et al. ........... 206/320 |
| 2007/0211420 A1 | 9/2007 | Bang |
| 2008/0316687 A1 * | 12/2008 | Richardson et al. .......... 361/680 |
| 2009/0051319 A1 * | 2/2009 | Fang et al. .................... 320/115 |
| 2009/0080153 A1 * | 3/2009 | Richardson et al. ..... 361/679.56 |
| 2009/0171224 A1 | 7/2009 | Jochim et al. |
| 2009/0179132 A1 * | 7/2009 | Qin et al. ....................... 248/371 |
| 2009/0186264 A1 * | 7/2009 | Huang ............................ 429/96 |
| 2010/0032335 A1 * | 2/2010 | Schindler ...................... 206/522 |
| 2010/0059649 A1 * | 3/2010 | Buxton ......................... 248/371 |
| 2010/0072334 A1 * | 3/2010 | Le Gette et al. ............ 248/176.3 |
| 2010/0078433 A1 * | 4/2010 | Mizukoshi et al. ........... 220/200 |
| 2010/0090085 A1 | 4/2010 | Corrion |
| 2010/0108683 A1 * | 5/2010 | Merritt ......................... 220/324 |
| 2010/0142130 A1 * | 6/2010 | Wang et al. ............. 361/679.01 |
| 2010/0213331 A1 | 8/2010 | Liou |
| 2010/0240427 A1 * | 9/2010 | Lee .......................... 455/575.8 |
| 2010/0300909 A1 * | 12/2010 | Hung ............................. 206/320 |
| 2011/0103032 A1 | 5/2011 | Loi et al. |
| 2011/0157800 A1 * | 6/2011 | Richardson et al. ..... 361/679.01 |
| 2011/0228458 A1 * | 9/2011 | Richardson et al. ..... 361/679.01 |
| 2011/0253850 A1 | 10/2011 | Bau |
| 2011/0260014 A1 * | 10/2011 | Chen ............................. 248/157 |
| 2011/0285258 A1 * | 11/2011 | Yuan .......................... 312/223.2 |
| 2012/0008300 A1 * | 1/2012 | Ladouceur et al. ............ 361/807 |
| 2012/0050988 A1 * | 3/2012 | Rothkopf et al. ............. 361/688 |
| 2012/0146466 A1 * | 6/2012 | Lu et al. ..................... 312/223.1 |
| 2012/0162102 A1 * | 6/2012 | Cheng et al. .................. 345/173 |
| 2012/0262853 A1 * | 10/2012 | Sung ........................ 361/679.01 |
| 2012/0325689 A1 | 12/2012 | Wibby et al. |
| 2013/0027862 A1 * | 1/2013 | Rayner ...................... 361/679.3 |
| 2013/0099637 A1 * | 4/2013 | Richardson et al. ........ 312/223.1 |
| 2013/0113348 A1 * | 5/2013 | Holben et al. ............. 312/223.1 |
| 2013/0127308 A1 * | 5/2013 | Yang .......................... 312/223.1 |
| 2013/0127309 A1 * | 5/2013 | Wyner et al. .............. 312/223.1 |
| 2013/0210317 A1 * | 8/2013 | Hageman et al. .............. 446/396 |

* cited by examiner

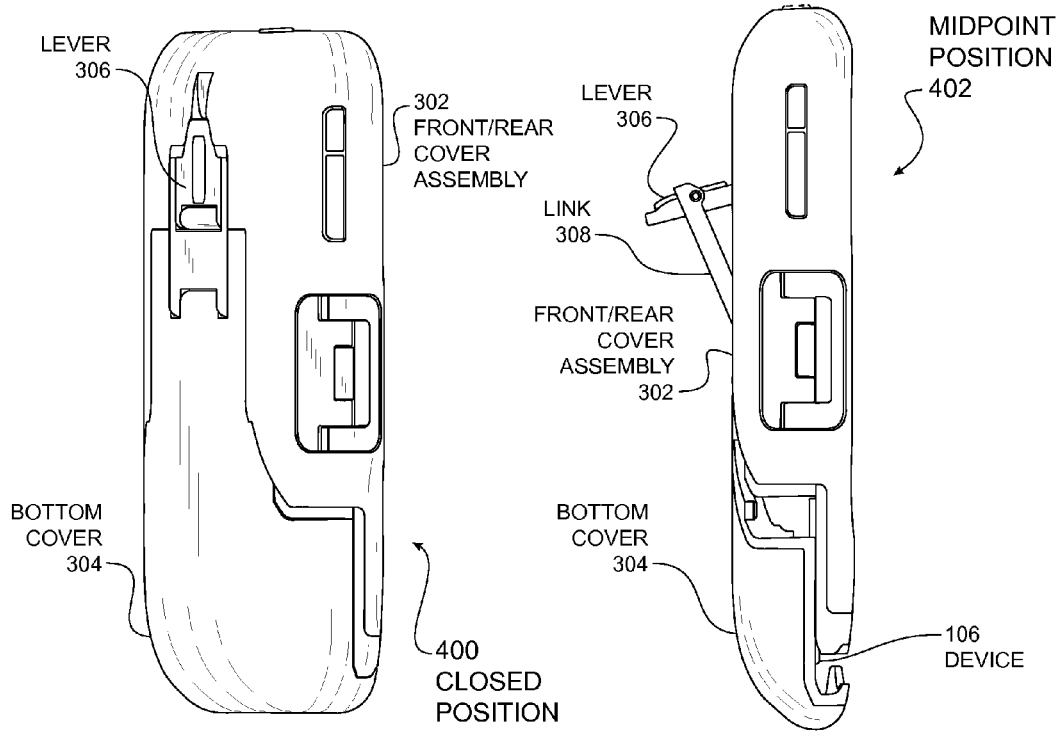
FIG. 4A
FIG. 4B
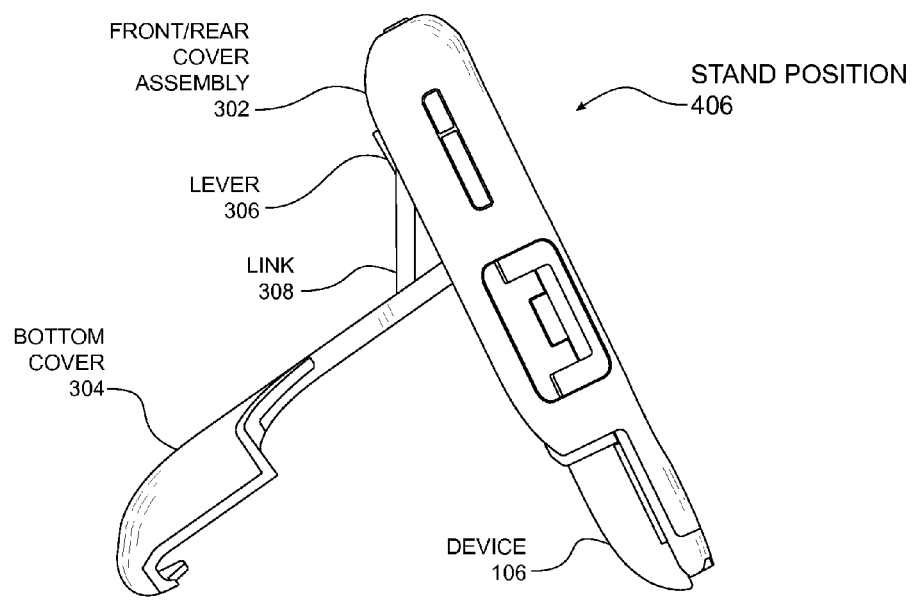
FIG. 4C

PROTECTIVE CASE WITH INTEGRAL STAND

BACKGROUND

Portable electronic devices are ubiquitous. As these devices increase in usefulness, their value to the users increases dramatically. Any damage to a device that results in downtime may be cause for alarm.

SUMMARY

A protective case for an electronic device may have two rigid covers that are engaged with a clamping mechanism. The rigid covers, when engaged to the device, may be covered with a removable flexible cover. The protective case may also include a third component that may provide protection for the device in a closed position and operate as a stand in an open position. The third component may be opened and closed using a locking lever, and the third component may open to a stand position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 4A is a side view of an embodiment showing a protective case in a closed position.

FIG. 4B is a side view of an embodiment showing a protective case in a midpoint position.

FIG. 4C is a side view of an embodiment showing a protective case in a stand position.

DETAILED DESCRIPTION

A protective case may provide protection for a device as well as a stand for using the device. The case may consist of front and rear covers, along with a bottom cover. The front and rear cover may clamp together to hold the device, and the bottom cover may have a closed position which protects the device, as well as an open position that operates as a stand. The bottom cover may be operated using a clamping mechanism.

The front and rear covers may clamp together to hold the device. One or more clamping mechanisms may cause the front and rear covers to clamp or interfere with the device, which may prevent the device from sliding within the cover. In one embodiment, a tab and receiver mechanism may hold the covers together while one or more clamps may secure the covers together. The front and rear covers may be rigid material. In some embodiments, one or more pads may be included between the covers and the device. The pads may be nonslip pads, conformable pads, or other material that may keep the device from shifting while in the cover. In some embodiments, such pads may be incorporated to minimize any marking or abrasion that may occur between the device and the covers.

The case may have a flexible cover that may be installed over the front and rear covers. The flexible case may be stretched during installation such that the flexible case may fit snugly against the covers when installed. The flexible case may engage the case using a series of posts and holes that engage each other during assembly.

The case may also have a bottom cover. The bottom cover may be attached to the rear cover using a latch mechanism, and the bottom cover may positioned in a closed position that protects the device, as well as an open position that may serve as a stand. The bottom cover may be constructed of a rigid material and may have a flexible cover in some embodiments.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
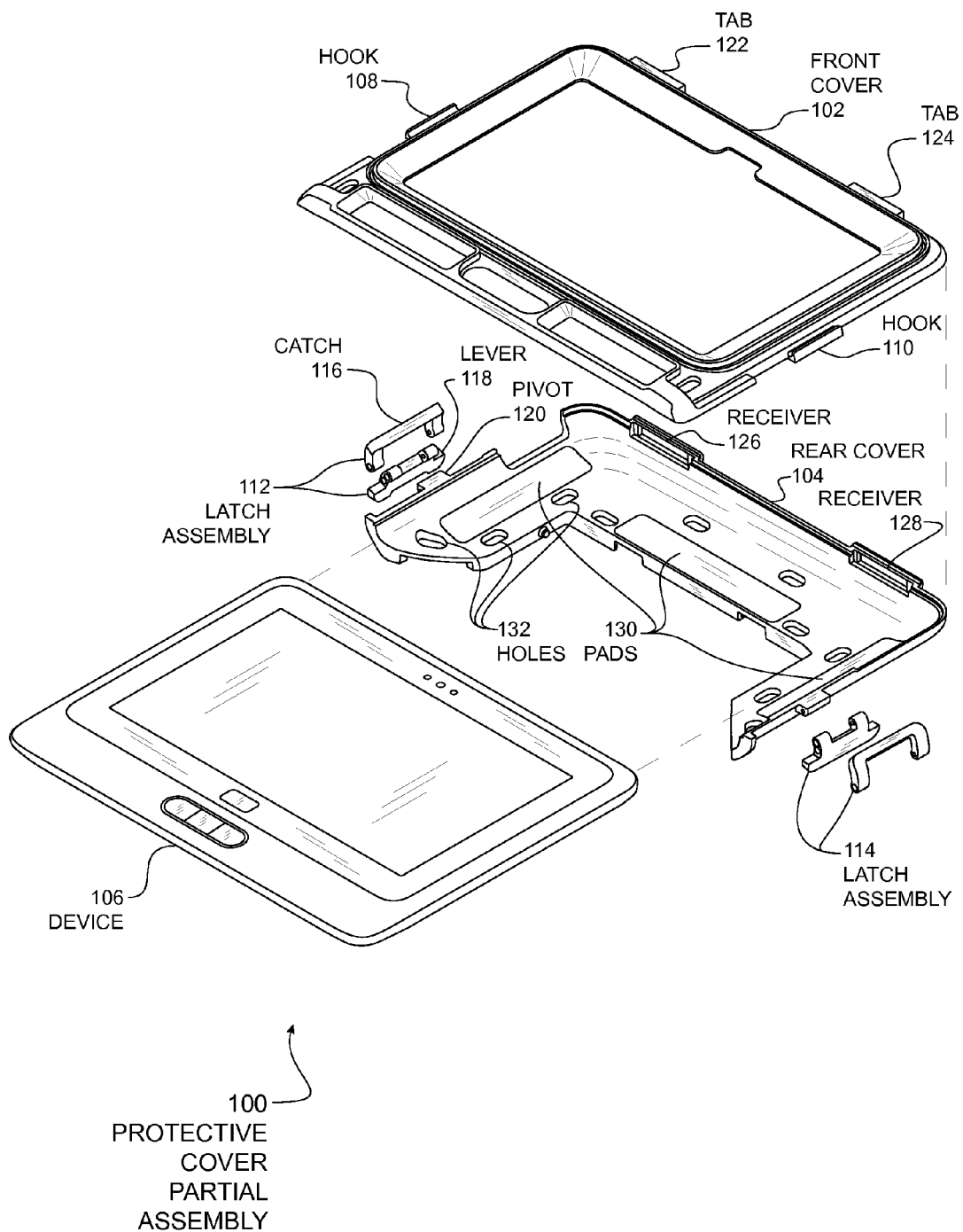
FIG. 1 is a perspective illustration of an embodiment showing a protective case in an exploded view.

FIG. 1 is a perspective exploded view of an embodiment 100 showing a portion of a cover for a device 106. FIG. 1 is not to scale.

Embodiment 100 illustrates an example of a protective cover that latches together to hold the device 106. The protective cover is made up of a front cover 102 and a rear cover 104. The protective cover also may have a bottom cover and other components that are not shown, including a flexible cover that may be installed over the assembled front cover 102 and rear cover 104.

The front cover 102 and rear cover 104 may surround and hold the device 106, leaving openings for various displays, buttons, connectors, and other features. The cover may allow the device to be operated yet remain protected. In some embodiments, the fully assembled cover may protect the device 106 from shock, vibration, impact, dust, mist, water, or other factors.

The front cover 102 and rear cover 104 may be manufactured from a rigid material. In some embodiments, the rigid material may be a moldable thermoplastic material, while other embodiments may use other materials.

The front cover 102 may attach to the rear cover 104 in a removable fashion. The front cover 102 may have two tabs 122 and 124 that may engage receivers 126 and 128. The tabs and receivers may cause the front cover 102 and rear cover 104 to connect to each other along the top edge of the assembly.

On the sides of the assembly, latches may clamp the front cover 102 and rear cover 104 to each other, thereby sandwiching the device 106. The latch assembly 112 may consist of a catch 116 that engages a hook 108 on the front cover 104, and a lever 118 that clamps using an over-center latch mechanism. On the opposite side of the assembly, the latch assembly 114 may have a similar set of components that engage a hook 110 on the front cover 102.

The latches allow a user to assemble the cover to the device 106. In a typical embodiment, the cover may be sold as an accessory to the device 106 and may or may not be necessary for the device 106 to be used.

Because the front cover 102 and rear cover 104 use a clamping mechanism to hold the device 106, the front cover 102 and rear cover 104 may provide various mechanisms to grab or hold the device 106. When installed, movement between the cover and the device 106 may be minimized to avoid scratching or abrading the device 106, as well as to hold the device 106 securely when the removable bottom cover is opened and closed.

One mechanism to hold the device 106 may be to apply an interference fit between the assembled covers and the device 106. An interference fit may be a situation where the assembled covers or the device 106 may mechanically deflect, bend, or otherwise assert pressure against each other while in the assembled position. In some embodiments, the interference fit may be on the order of 0.005 in, while other embodiments may have interference fits of 0.010 in, 0.025 in, 0.035 in, 0.050 in or more.

The interference fit may cause pressure to be applied through the front and rear covers to the device 106, thus holding the device 106 in place.

Some embodiments may include one or more compliant pads 130. The pads may be soft, conformable pads that may compress against the device 106. Embodiment 100 shows the pads attached to the rear cover 104, but other embodiments may have pads attached to the front cover 102 in addition to or in lieu of the pads 130.

The pads 130 may be crushed or compressed when the latches are engaged, clamping the device 106 in place. The pads 130 may compress some amount based on a designed-in interference fit as described above.

The rear cover 104 is shown with various holes 132. The holes 132 may receive a post that may be incorporated into a flexible cover that covers the assembled front cover 102 and rear cover 104. The holes 132 and posts are a mechanism by which the flexible cover may be held in place once the flexible cover is installed. A detailed description of the holes and posts mechanism may be found in FIG. 5.

Figure 2:
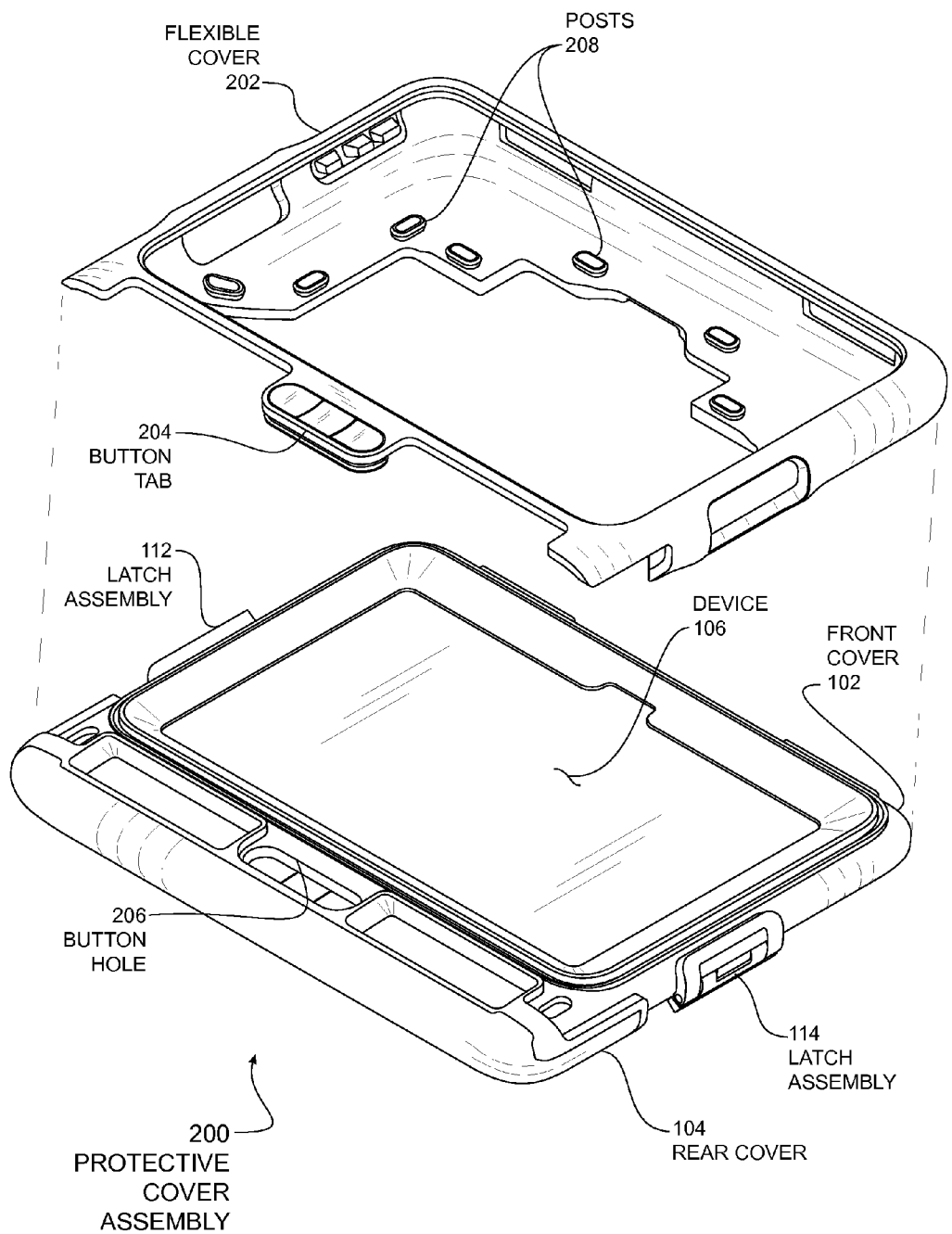
FIG. 2 is a perspective illustration of an embodiment showing a protective case with a flexible cover.

FIG. 2 is a perspective exploded view of an embodiment 200 showing the assembled front cover 102, rear cover 104, and device 106 prior to receiving a flexible cover 202. FIG. 2 is not to scale.

The front cover 102, rear cover 104, and device 106 are illustrated as being assembled with the latch assemblies 112 and 114 fastened and engaged.

The flexible cover 202 may be a molded silicone or other stretchable, conformable material. The flexible cover 202 may be installed over the assembled front cover 102, rear cover 104, and device 106 to provide a two layer protection to the device 106. The two layer design may provide very high levels of impact resistance, as well as other types of protection. The flexible cover 202 may be removed in the reverse manner as installation.

The installation process may involve stretching the flexible cover 202 over and around the assembled front and rear covers, then fitting the posts 208 in the corresponding holes on the rear cover (not shown). The flexible cover 202 may have other mechanisms by which the flexible cover may be secured or attached to the assembled rigid covers. Such additional mechanisms may include ribs, tabs, or other features in the rigid covers over which the flexible cover may be formed, or ribs, tabs, or other features in the flexible cover that may engage with matching features in the rigid covers.

The flexible cover 202 may contrast with the covers both in texture and color. In many embodiments, the flexible cover may have a texture or feel that is tacky or otherwise contrasts with the hard surface of the rigid covers. Some embodiments may construct the various cover components from different colored materials to give the assembled cover an interesting and visually pleasing look.

Figure 3:
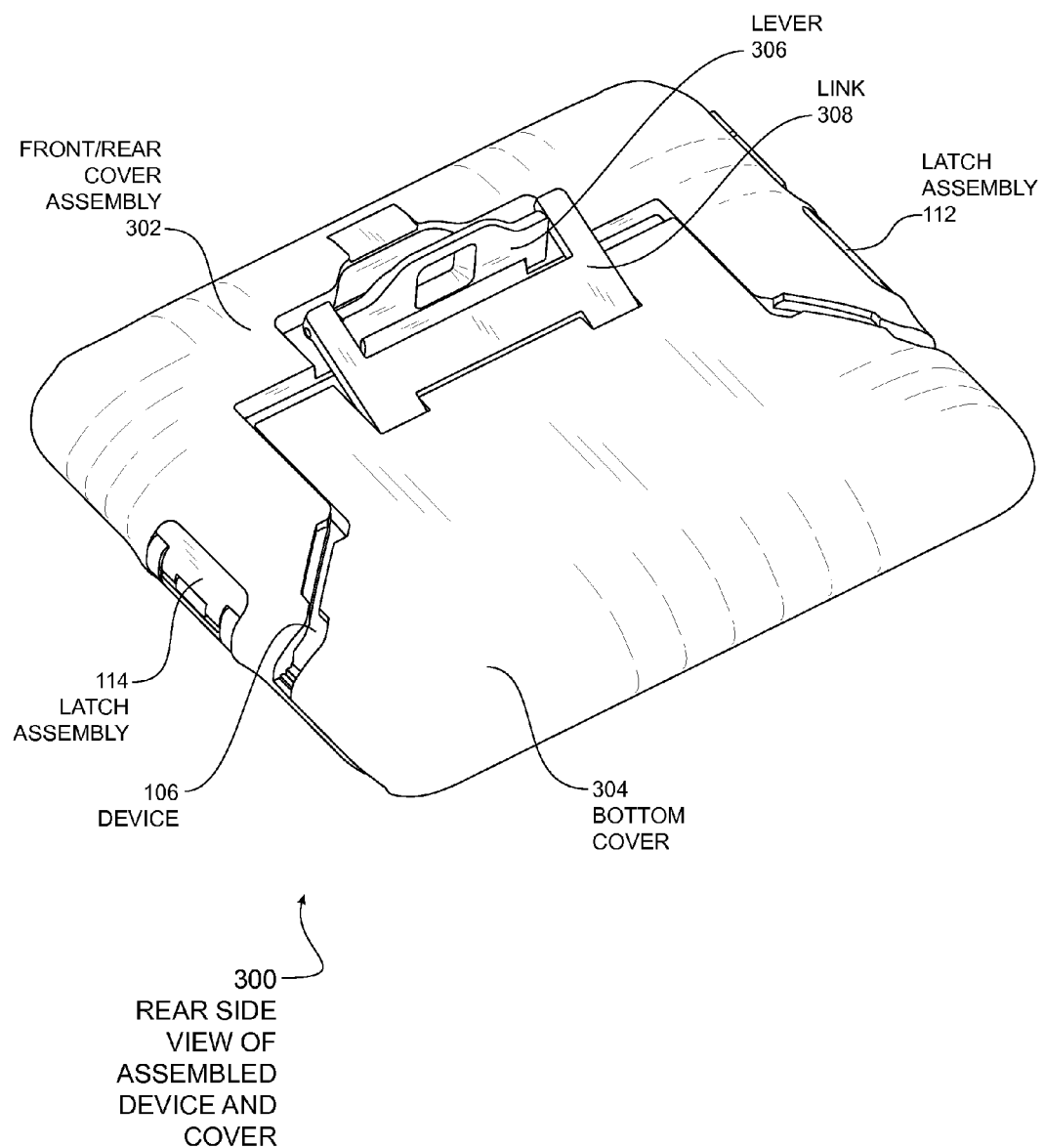
FIG. 3 is a perspective illustration of an embodiment showing a protective case from the rear.

FIG. 3 is a perspective view of an embodiment 300 showing the rear portion of a cover for a device 106. FIG. 3 is not to scale.

FIG. 3 illustrates the front and rear cover with the assembled flexible cover 302 and a bottom cover 304. The bottom cover 304 may be attached to the cover assembly 302 using a lever 306 and link 308. The lever 306 and link 308 may be used to open and close the bottom cover 304. In an open position, the bottom cover 304 may be moved into a stand position that supports the device 106 for placing on a flat surface, such as a desk or table.

In many embodiments, the lever 306 and link 308 may be attached to the rear cover and bottom cover 304 in a permanent manner. In one such embodiment, these components may be attached using metal pins about which the connections may rotate. In another such embodiment, the various components may snap together and rotate with respect to each other.

The lever 306 and link 308 may act as a clamping or latching mechanism that clamps the bottom cover 304 around the device 106 from the bottom. In some embodiments, there may be a designed-in interference such that the compression of the device 106 may cause the latch mechanism of the lever 306 and link 308 to close in an over center condition. In some embodiments, the bottom cover 304 may include a conformable pad that may compress when the latch mechanism actuates the bottom cover into a closed position.

The bottom cover 304 may be constructed in the same manner as the front cover and rear cover. In some embodiments, the bottom cover 304 may have a rigid or hard shell with a second softer material. Some such embodiments may have a removable flexible cover that attaches to the outside of a hard shell inner cover. Other embodiments may have an overmolded cover that may be molded onto the rigid inner cover. Some such embodiments may not allow the overmolded cover to be removed from the rigid inner cover.

In many embodiments, the various covers may have openings for accessing buttons, switches, connectors, speakers, microphones, or other features of the device 106. Some such embodiments may have a flexible door that may be closed during normal operation, but flipped open by a user to access a switch, connector, or other feature of the device 106.

FIGS. 4A, 4B, and 4C are a side view sequence showing how the protective cover may be operated from a closed position to a stand position. FIGS. 4A, 4B, and 4C are not to scale.

FIG. 4A is a side view of an embodiment 400 showing a protective case in a closed position. The front/rear cover assembly 302 and bottom cover 304 are shown engaged and locked. The lever 306 is illustrated as being folded flat onto the rear cover.

FIG. 4B is a side view of an embodiment 402 showing the protective case at a midpoint position. At the midpoint position, the bottom cover 304 is separated from the front/rear cover assembly 302 when the lever 306 is raised. When the lever 306 is raised, the link 308 pushes the bottom cover 304 downward, revealing the device 106.

The front and rear covers may clamp the device 106 so that when the bottom cover 304 is extended, the device 106 remains securely within the front/rear cover assembly 302.

FIG. 4C is a side view of an embodiment 404 showing the protective case in a stand position. From the midpoint position of embodiment 402, the bottom cover 304 may be rotated counter clockwise until the lever 306 is again flat against the rear cover. The link 308 may cause the bottom cover 304 to stop rotating counter clockwise and may hold the device 106 in an upright position.

Figure 5A:
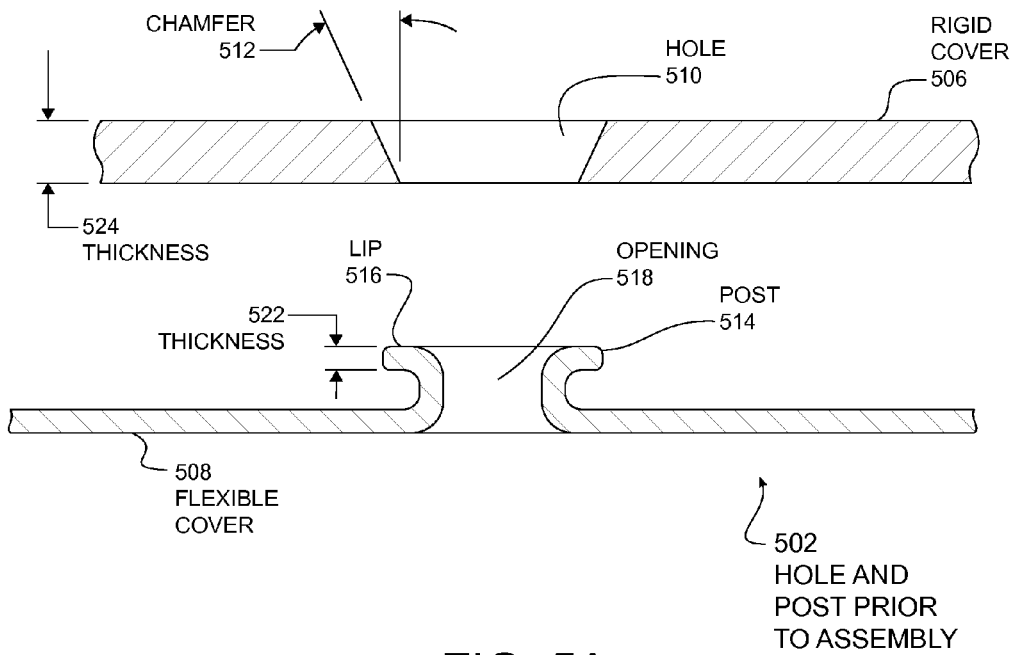
FIG. 5A is a cross sectional view of an embodiment showing a hole and post mechanism prior to assembly.
Figure 5B:
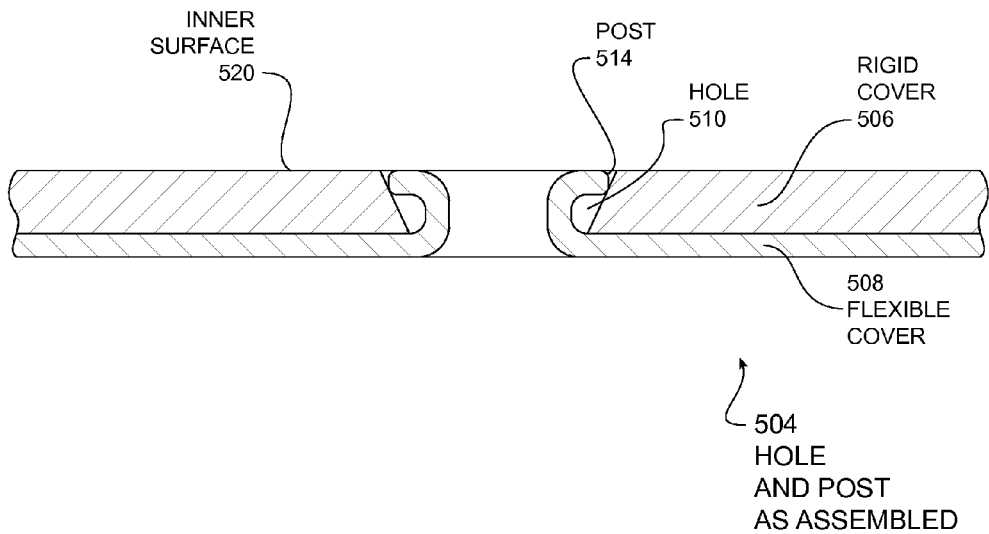
FIG. 5B is a cross sectional view of an embodiment showing a hole and post mechanism after assembly.

FIGS. 5A and 5B are cross sectional views of a hole and post. Embodiment 502 shown in FIG. 5A illustrates the hole and post prior to installation. Embodiment 504 shown in FIG. 5B illustrates the hold and post after installation. FIGS. 5A and 5B are not to scale.

The hole and post design is a mechanism to attach a flexible cover to a rigid cover. In embodiment 100, the holes 132 were shown as oval or oblong holes through which posts 208 in embodiment 200 may fit. The hole and post design may be used to attach a flexible cover to any rigid cover, including the front, rear, or bottom covers as shown in the various embodiments. Other embodiments may have holes that are circular, square, rectangular, or odd shaped.

Embodiment 502 shows a rigid cover 506 and a flexible cover 508.

The rigid cover 506 has a hole 510. The hole 510 may have a chamfer 512. The chamfer 512 may be an angle from 0 degrees to 60 degrees, but often is 5, 10, 15, 20, or 30 degrees.

The post 514 of the flexible cover 508 may have a lip 516 and an opening 518.

Embodiment 504 illustrates the hole and post in the assembled state. The rigid cover 506 and flexible cover 508 are in contact, and the post 514 has been inserted into the hole 510.

In the assembled state, the post 514 may extend past the inner surface 520 of the rigid cover 506. In some embodiments, the post 514 may be flush with or recessed from the inner surface 520.

The design of the hole and post may allow for easy insertion of the post into the hole, as the post may have an opening 518 into which a portion of the post may collapse during insertion. Once inserted, the post may spring back to its original configuration and the lip 516 may engage the side of the hole 510 along the chamfered portion.

In many embodiments, the thickness 522 of the lip 516 may be less than half of the thickness 524 of the rigid cover 506. Some embodiments may have the thickness 522 being greater than half of the thickness 524 of the rigid cover.

Figure 6A:
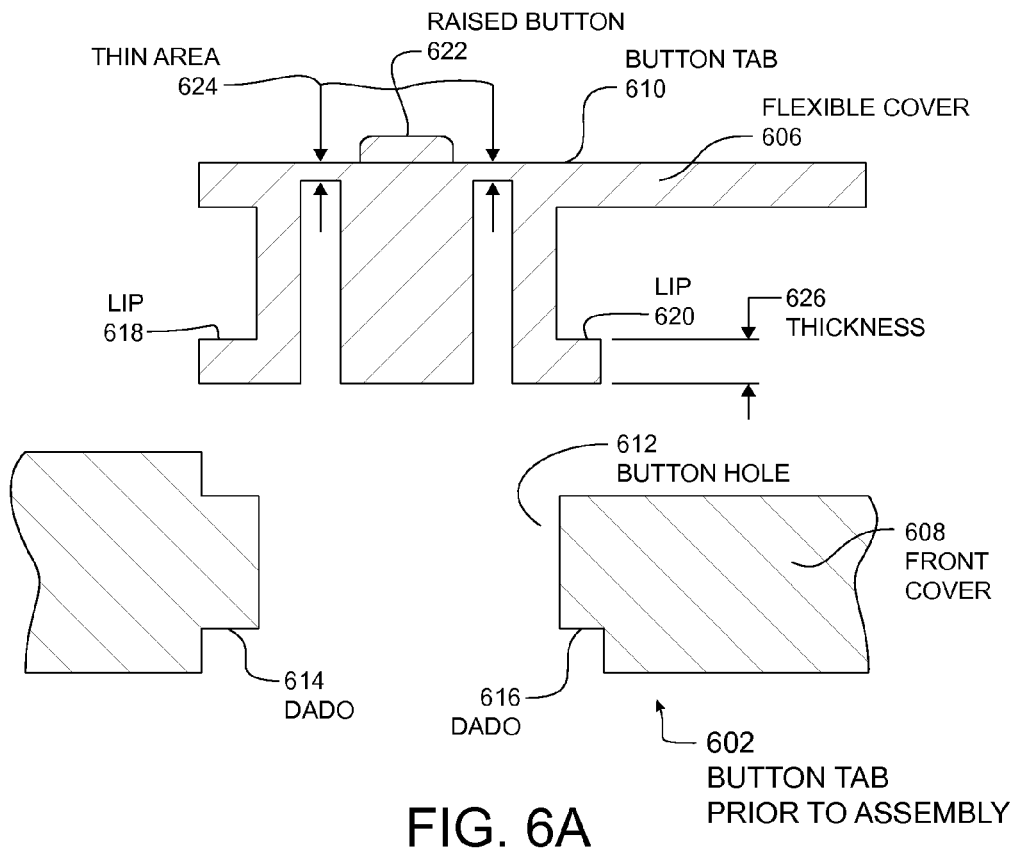
FIG. 6A is a cross sectional view of an embodiment showing a button tab and cover prior to assembly.
Figure 6B:
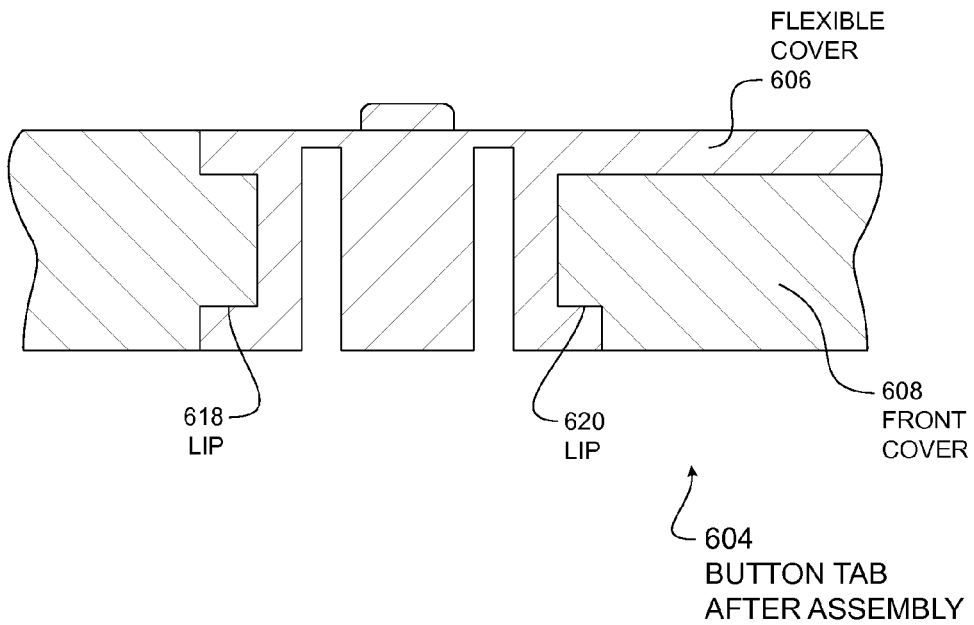
FIG. 6B is a cross sectional view of an embodiment showing a button tab and cover after assembly.

FIGS. 6A and 6B are cross sectional views of a button tab and front cover before assembly and after assembly. FIGS. 6A and 6B are not to scale.

FIG. 6A shows embodiment 602 before assembly, while FIG. 6B shows embodiment 604 after assembly. A flexible cover 606 contains a button tab 610 that is assembled onto an opening in a front cover 608.

The button tab 610 may have lips 618 and 620 around the bottom of the button tab 610. In many embodiments, the lips may form a continuous lip around the bottom of the button tab 610. Other embodiments may have lips that are formed only partially around the lower edge of the button tab 610.

The button tab 610 may have a raised button 622 that may indicate to the user that a button may be underneath the tab when installed. The button tab 610 may also have a thin area 624 that may encircle the raised button 622. The thin area 624 may allow the center portion of the button tab 610 to flex and press a button on a device when the protective case is installed on the device.

The front cover 608 may have a pair of dados 614 and 616 that correspond to the lips 618 and 620. When the button tab 610 is installed into the front cover 608 as in embodiment 604, the lips 618 and 620 may be located in the dados 614 and 616, thus holding the button tab 610 to the front cover 608 and positioning the center portion of the button tab 610 for pressing against a button on a device.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A protective case for a mobile electronic device, the protective case comprising:
    a first rigid cover for covering a first portion of the mobile electronic device, the first rigid cover including mating surfaces;
    a second rigid cover for covering a second portion of the mobile electronic device, the second rigid cover including mating surfaces, and the second rigid cover engageable with the first rigid cover to at least partially enclose the mobile electronic device;
    a link member permanently and rotatably attached to a back of the second rigid cover; and
    a lever permanently and rotatably attached to the link member and permanently and rotatably attached to the first rigid cover such that the lever forms a clamping mechanism with the link member to removably clamp the first rigid cover to the second rigid cover, wherein the first rigid cover, the second rigid cover, the link member, and the lever comprise a single assembly configurable to multiple positions, and wherein:
    rotating the lever in a first direction actuates the link member to draw the second rigid cover toward the first rigid cover to engage the mating surfaces of the second rigid cover to the mating surfaces of the first rigid cover such that the second rigid cover covers the second portion of the mobile electronic device, the first rigid cover and the second rigid cover forming an opening through which a display of the mobile electronic device is accessible, and
    rotating the lever in a second direction disengages the mating surfaces of the second rigid cover from the mating surfaces of the first rigid cover such that the second rigid cover is rotatable relative to the mobile electronic device and relative to the first rigid cover to form a stand for the mobile electronic device and the first rigid cover.

2. The protective case of claim 1 further comprising a flexible cover mountable over at least a portion of the first rigid cover and the second rigid cover.

3. The protective case of claim 2 wherein the flexible cover includes an orifice providing access to the link member and the lever through the orifice.

4. The protective case of claim 1 further comprising a slip resistant pad disposed to contact the mobile electronic device when the first rigid cover is installed on the mobile electronic device.

5. The protective case of claim 1 further comprising a slip resistant pad disposed to contact the mobile electronic device when the second rigid cover is installed on the mobile electronic device.

6. The protective case of claim 1 wherein at least one of the first rigid cover and the second rigid cover have at least a 0.005 inch interference fit with the mobile electronic device.

7. A protective case for an electronic device, the protective case comprising:
   a top cover for covering a top portion of the electronic device, the top cover including mating surfaces;
   a bottom cover for covering a bottom portion of the electronic device, the bottom cover including mating surfaces, and the bottom cover engageable with the top cover to at least partially encase the electronic device and form, with the top cover, an opening through which a display of the electronic device is accessible when the electronic device is in the protective case;
   a link member rotatably and permanently attached to a back of the bottom cover; and
   a lever rotatably and permanently attached to the link member and rotatably and permanently attached to the top cover, the protective case being a single assembly comprising the top cover, the bottom cover, the link member, and the lever, and wherein:
      rotating the lever in a first direction actuates the link member to draw the mating surfaces of the bottom cover to the mating surfaces of the top cover to engage the bottom cover to the top cover so that the bottom cover covers the bottom portion of the electronic device, and
      rotating the lever in a second direction disengages the mating surfaces of the bottom cover from the mating surfaces of the top cover so that the bottom cover can be rotated relative to the electronic device and the top cover to form a stand for the electronic device and the top cover.

8. The protective case of claim 7 further comprising a flexible cover mountable over the top cover and the bottom cover.

9. The protective case of claim 8 wherein the flexible cover includes an aperture providing access to the link member and the lever when the flexible cover is mounted on the top cover and the bottom cover.

10. The protective case of claim 7 further comprising a slip resistant pad disposed to contact the mobile electronic device when the top cover is installed on the mobile electronic device.

11. The protective case of claim 7 further comprising a slip resistant pad disposed to contact the mobile electronic device when the bottom cover is installed on the mobile electronic device.

12. The protective case of claim 7 wherein the top cover and the bottom cover have at least a 0.005 inch interference fit with the mobile electronic device when the top cover and the bottom cover are installed on the mobile electronic device.

13. The protective case of claim 7 wherein the lever and the link member form a clamping mechanism to removably clamp the top cover to the bottom cover.

14. The protective case of claim 13 wherein the clamping mechanism removably clamps the top cover to the bottom cover by closing to an over center position.

15. A protective cover for a mobile electronic device, the protective cover comprising:
   an assembly including:
      a first rigid cover for covering a first portion of the mobile electronic device, the first rigid cover including mating surfaces;
      a second rigid cover for covering a second portion of the mobile electronic device, the second rigid cover including mating surfaces, and the second rigid cover engageable with the first rigid cover to at least partially enclose the mobile electronic device and form an opening through which a portion of the mobile electronic device is accessible when the mobile electronic device is in the protective cover;
      a flexible cover mountable over at least a portion of the first rigid cover and the second rigid cover;
      a link member permanently rotatably attached to a back of the second rigid cover; and
      a lever permanently rotatably attached to the link member and permanently rotatably attached to the first rigid cover such that the lever forms a clamping mechanism with the link member to removably clamp the first rigid cover to the second rigid cover, wherein rotating the lever in a first direction actuates the link member to draw the mating surfaces of the second rigid cover toward the mating surfaces of the first rigid cover to engage the second rigid cover to the first rigid cover such that the second rigid cover covers the second portion of the mobile electronic device, and rotating the lever in a second direction disengages the mating surfaces of the second rigid cover from the mating surfaces of the first rigid cover such that the second rigid cover can be rotated relative to the mobile electronic device and relative to the first rigid cover to form a stand for the mobile electronic device and the first rigid cover.

* * * * *